(12) United States Patent
Shang et al.

(10) Patent No.: US 12,248,876 B1
(45) Date of Patent: Mar. 11, 2025

(54) NETWORK THREAT INTELLIGENCE RELATIONAL TRIPLE COMBINED EXTRACTION METHOD BASED ON DEEP LEARNING

(71) Applicant: Guangzhou University, Guangzhou (CN)

(72) Inventors: Wenli Shang, Guangzhou (CN); Bowen Wang, Guangzhou (CN); Haotian Shi, Guangzhou (CN); Zhiwei Chang, Guangzhou (CN); Meng Zhang, Guangzhou (CN); Hai Jie, Guangzhou (CN); Zhong Cao, Guangzhou (CN); Man Zhang, Guangzhou (CN); Sha Huan, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 18/923,078

(22) Filed: Oct. 22, 2024

(30) Foreign Application Priority Data

Nov. 9, 2023 (CN) .......................... 202311494302.4

(51) Int. Cl.
| | |
|---|---|
| *G06N 3/08* | (2023.01) |
| *G06F 40/12* | (2020.01) |
| *G06F 40/211* | (2020.01) |
| *G06F 40/279* | (2020.01) |
| *H04L 9/40* | (2022.01) |

(52) U.S. Cl.
CPC .............. *G06N 3/08* (2013.01); *G06F 40/12* (2020.01); *G06F 40/211* (2020.01); *G06F 40/279* (2020.01); *H04L 63/14* (2013.01)

(58) Field of Classification Search
CPC ........ G06N 3/08; G06F 40/279; G06F 40/211
See application file for complete search history.

(56) References Cited

U.S. PATENT DOCUMENTS

| 11,120,225 B2 * | 9/2021 | Tan .................. G06N 20/00 |
| 2018/0248895 A1 * | 8/2018 | Watson ............. G06N 7/01 |
| 2022/0036302 A1 * | 2/2022 | Cella ................ G06N 20/00 |

FOREIGN PATENT DOCUMENTS

| CN | 111552855 A | * | 8/2020 | .......... G06F 16/951 |
| CN | 112131882 A | * | 12/2020 | .......... G06F 40/284 |
| CN | 113850109 A | * | 12/2021 | .............. G06N 3/08 |
| CN | 114118779 A | * | 3/2022 | .......... G06F 16/367 |
| CN | 115618857 A | * | 1/2023 | .......... G06F 40/216 |

(Continued)

*Primary Examiner* — Mohammad K Islam
(74) *Attorney, Agent, or Firm* — Getech Law LLC; Jun Ye

(57) ABSTRACT

A network threat intelligence relational triple combined extraction method based on deep learning includes: (a) an entity and a relation are both extracted by using a combined extraction method, which solves the problem of a lack of interaction between entity and relation extraction tasks; (b) a problem of entity overlapping is solved by using a method based on a span; (c) a BERT large-scale pre-training model is used for vector representation of a text; and because the pre-training model includes contextual information learned from a large-scale corpus, semantic expression on a threat intelligence text by the model can be extremely enriched; and (d) various modal information, for example, time sequences, dependency relations, the spans, labels, and the like, is fused to enhance the interaction between multimodal information.

10 Claims, 1 Drawing Sheet

(56) References Cited

FOREIGN PATENT DOCUMENTS

| CN | 116561668 | A | * | 8/2023 | ........... G06F 40/279 |
| CN | 116611436 | A | * | 8/2023 | ............ G06F 40/211 |
| CN | 117332786 | A | * | 1/2024 | ............. G06F 40/30 |
| CN | 116611436 | B | * | 7/2024 | ............ G06F 40/211 |
| CN | 118709654 | A | * | 9/2024 | ............ G06F 40/211 |
| CN | 115017404 | B | * | 10/2024 | ........... G06F 16/951 |
| JP | 2024054911 | A | * | 4/2024 | ........... G06F 40/205 |

* cited by examiner

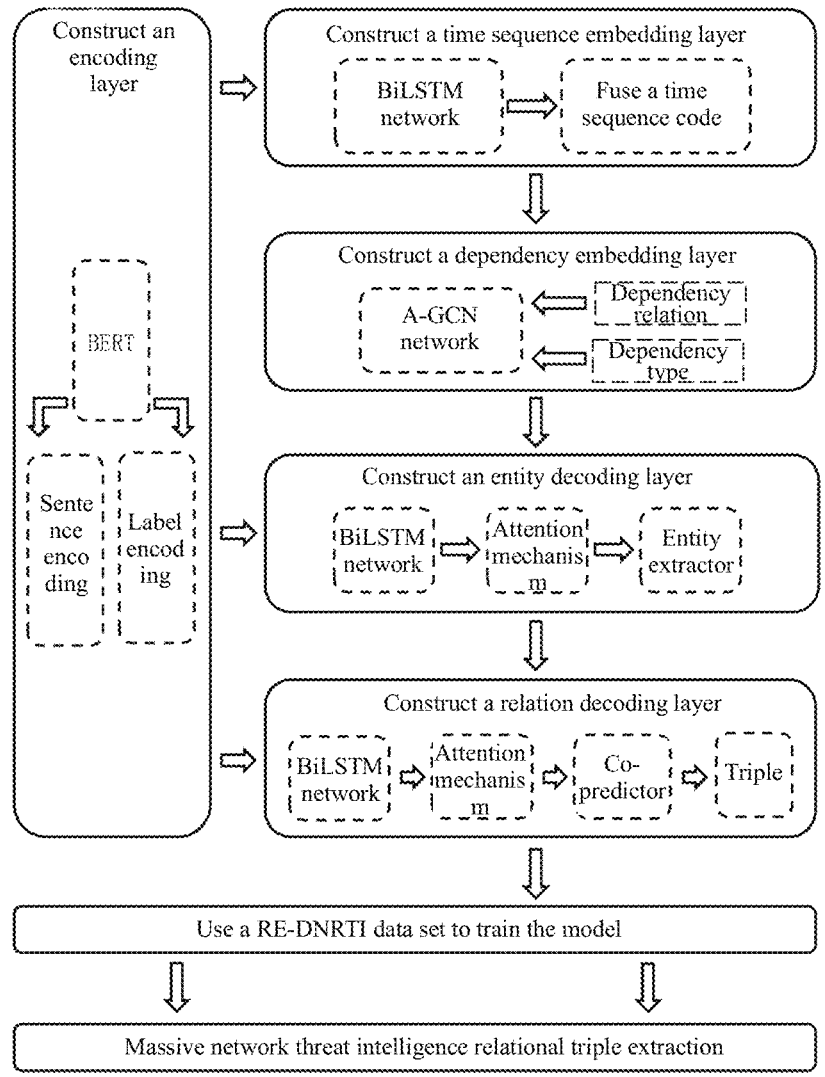

NETWORK THREAT INTELLIGENCE RELATIONAL TRIPLE COMBINED EXTRACTION METHOD BASED ON DEEP LEARNING

TECHNICAL FIELD

The present invention belongs to the technical field of network security, and particularly relates to a network threat intelligence relational triple combined extraction method based on deep learning.

BACKGROUND

With continuous development computer networks, network attacks become increasingly complex as well. Due to deficiencies of lack of an active defense capability, excessive rely on known vulnerability databases, long response time, slight lack of intelligentization and individuation of the defense polices, conventional network security defense policies hardly cope with complicated and changeable novel network attacks. However, with explosive development of artificial intelligence and big data technology, thanks to efficient search capability and powerful inferential capability, the knowledge graph technology combining expert knowledge with massive data is widely pursued. Experts and scholars in the network security field have started to help a system efficiently cope with the complicated and changeable network attack environments by using the knowledge graph technology. Before this, it is necessary to construct a network threat intelligence knowledge graph first, where a relational triple serves as a basic unit of the knowledge graph and a relational triple extraction technology is the priority among priorities.

Network threat intelligence relational triple extraction can be divided into entity extraction and relation extraction, where a streamline mode is to perform the two tasks independently, and a combined extraction mode is to perform the two tasks at the same time. The major tasks are to extract entities and relations of pre-defined entity and relation types from massive semi-structural or non-structural threat intelligence data. The purpose is to perform deep association analysis and excavation of fine granularity for massive multisource isomeric network threat intelligent data to extract useful information.

Compared with the relational triple extraction technology in the universal field, due to different entity and relation types concerned, the network threat intelligent relational triple extraction technology has the following difficulties: (a) there are many network threat intelligence entity types and the change frequency is relatively high; (b) the semantic similarity of network threat intelligence entity is high and the entities are easily mixed; (c) the network threat intelligence messages are usually long in single sentence, and the correlation between the entities is relatively weak; and (d) there are many overlapped triples in the network threat intelligence, the difference among the triples is hardly identified, and it is necessary to deeply excavate features of the fine granularity.

SUMMARY

In view of the above defects in the prior art, an object of the present invention is to provide a network threat intelligence relational triple combined extraction method based on deep learning to construct a relational triple combined extraction model for a multimodal information perception embedding mechanism based on a span, with adoption of the following technical solution: (a) an entity and a relation are both extracted by using a combined extraction method, which solves the problem of an interactive lack between entity and relation extraction tasks; (b) a problem of overlapping entities is solved by using a method based on span; (c) a BERT large-scale pre-training model is used for vector representation of a text. Because the pre-training model includes contextual information learned from a large-scale corpus, semantic expression on a threat intelligence text by the model can be extremely enriched; and (d) various modal information, for example, time sequences, dependency relations, the spans, labels, and the like, is fused to enhance the interaction between multimodal information. Thus, the problems of the long span of the text, high semantic similarity of the entities, and weak correlation among entities are alleviated.

The present invention provides a network threat intelligence relational triple combined extraction method based on deep, including the following steps:

step S1: converting input text information into a vector representation and acquiring semantic information: encoding entity type words and relation type words to acquire label words, and encoding a network thread intelligence sentence sequence to obtain a sentence sequence S;

step S2: acquiring time sequence information and a long-term dependency relation of each word segment in a sentence representation sequence S in a sentence to obtain a sentence representation sequence T;

step S3: acquiring a syntactic dependency relation between the word segments of an input sequence T and a label of the syntactic dependency relation, acquiring syntactic dependency information of the word segment and embedding the same into the sentence representation sequence T, and performing calculation in combination with a dependency type attention score and a standard GCN formula to obtain a sentence representation sequence H;

step S4: extracting an entity span: listing all possible spans, dividing the sentence representation sequence H into three portions by taking the span as a center and performing max pooling on the three portions respectively to integrate span features, acquiring interactive information of span time sequence information, the span and an entity label, and filtering a redundancy span to obtain an entity span set L;

step S5: extracting a relational triple: listing all possible entity pairs according to the entity span set L, dividing a sentence representation sequence L into five portions by taking an entity span pair as a center and performing max pooling on the three portions respectively except the entity span pair to integrate span features, acquiring interactive information of time sequence information of the entity span pair, the entity span pair, and a relation label, and inputting an entity span pair sequence into a co-predictor to obtain a relational triple set Ts;

step S6: performing iterative training on network threat intelligence to obtain a network threat intelligence relational triple combined extraction model; and step S7: inputting massive network threat intelligence into the network threat intelligence relational triple combined extraction model to obtain a relational triple.

Further, each word in the input text information in step S1 is decomposed into word segment sets with smaller granularity and the word segment sets are inputted into a BERT model for encoding.

Further, in step S1, the entity type words and the relation type words are encoded by using the BERT model to obtain an entity type word embedding and a relation type work embedding, respectively $Pe=\{pe_1, pe_2, \ldots, pe_z\} \in \mathbb{R}^{z \times d_e}$ and $Pr=\{pr_1, pr_2, \ldots, pr_r\} \in \mathbb{R}^{r \times d_r}$, where $d_e$ is embedding dimensions of the entity type label words, z represents a quantity of the entity type label words, $d_r$ is embedding dimensions of the relation type label words, and r is a quantity of the relation type label words.

Further, in step S2, the sentence representation sequence S outputted by an encoding layer is inputted into a BiLSTM network for feature extraction to acquire the time sequence information and the long-term dependency relation of each word segment in the sentence.

Further, in step S3, a Stanford Core-NLP toolkit is used first to establish a type adjacent matrix $Tp(tp_{i,j})_{n \times n}$, where $tp_{i,j}$ represents a dependency relation type between $t_i$ and $t_j$, the syntactic dependency relation between the word segments inputted into the sentence representation sequence T and the label of the dependency relation are acquired, and then the T and the $Tp(tp_{i,j})_{n \times n}$ are inputted into an A-GCN to acquire the syntactic dependency information of the word segment.

Further, in step S4, the three representation sequences are connected to be inputted into the BiLSTM network to acquire the span time sequence information, span dimension information is fused into a span representation by using a multilayer perceptron MLP, a span representation based on the entity label is acquired by using a scaled-dot product attention mechanism, the span representations are connected to be inputted into an entity extractor, and the redundancy span is filtered to obtain a span set L which meets a requirement.

Further, in step S5, the five representation sequences are connected to be inputted into the BiLSTM network to acquire the time sequence information of the entity span pairs, an entity span pair representation based on the relation label is acquired by using an additive attention mechanism, an intensified entity span pair representation sequence is inputted into a multilayer perceptron MLP1 to calculate an entity pair relation score, an entity pair relation score of an original entity span pair inputted by an entity encoding layer is calculated by using a biaffine predictor, and the two entity pair relation scores are combined to be inputted into a co-prediction layer; and to identify an overlapping relation, the co-prediction layer uses a sigmoid activation function to acquire a relation probability and stores a relational triple with the relation probability greater than or equal to 0.5 to Ts.

Further, in step S6, a relation annotation is performed on a DNRTI data set to obtain a RE-DNRTI data set, the RE-DNRTI data set is inputted into the network threat intelligence relational triple combined extraction model for 50-time iterative training, and parameter settings with an optimal effect are selected to obtain an optimal network threat intelligence relational triple combined extraction model.

Further, in step S7, the massive network threat intelligence is divided by taking sentences as units and is inputted into the network threat intelligence relational triple combined extraction model to obtain the relational triple.

Further, the constructing a network threat intelligence relational triple combined extraction model based on deep learning include constructing the encoding layer, a time sequence embedding layer, a dependency embedding layer, an entity decoding layer, and a relation decoding layer, where the encoding layer is provided with the BERT model for sentence encoding and label encoding, the time sequence embedding layer is provided with a fused time sequence code of the BiLSTM network, the dependency embedding layer is provided with the A-GCN network to embed the dependency information into the sentence to represent, the entity decoding layer is provided with the BiLSTM network, the attention mechanism, and the entity extractor, and the relation decoding layer is provided with the BiLSTM network, the attention mechanism, and the co-predictor; and the encoding layer is connected to the time sequence embedding layer, the time sequence embedding layer is connected to the dependency embedding layer, the dependency embedding layer is connected to the entity decoding layer, the entity decoding layer is connected to the relation decoding layer, and the encoding layer is further connected to the entity decoding layer and the relation decoding layer.

The present invention has the following beneficial effects:

The present invention provides a relational triple combined extraction model for a multimodal information perception embedding mechanism based on a span. The model is designed to overcome existing difficulties in a relational triple extraction technology in the field of network threat intelligence. By using the combined extraction method, entity extraction and relation extraction share parameters, which solves the problem of an interactive lack streamline entity and relation extraction tasks. By using the method based on the span, the problem of overlapped entities is solved. By using the multimodal information perception embedding mechanism, information of various different modes such as semantic, time sequence, label and span is embedded into the sentence representations, which enhances the interaction among various modal information and alleviates the problems of a long text span, high similarity of entity semantics, and weak correlation among the entities. In the field of network threat intelligence, compared with a conventional relational triple extraction model based on a neural network, the identification effect of the present invention has significant superiority.

BRIEF DESCRIPTION OF DRAWINGS

FIG. 1 is a schematic diagram of an implementing flowchart of a network threat intelligence relational triple combined extraction method based on deep learning provided by the present invention.

DETAILED DESCRIPTION OF EMBODIMENTS

Embodiments of the present invention are described in detail below and are implemented based on the technical solution of the disclosure, and detailed embodiments and specific operating processes are provided. However, the protection scope of the present invention is not limited to the embodiments below.

An algorithm flow provided by the present invention is shown in FIG. 1, a network threat intelligence relational triple combined extraction model based deep learning is constructed. A network threat intelligence relational triple combined extraction method based deep learning is provided, including the following steps:

step S1: an encoding layer of the network threat intelligence relational triple combined extraction model based deep learning is constructed, input text information is converted into a vector representation and acquiring semantic information: encoding entity type words and relation type words to acquire label words, and a network thread intelligence sentence sequence is encoded to obtain a sentence sequence S;

step S2: a time sequence embedding layer of the network threat intelligence relational triple combined extraction model based deep learning is constructed, and time sequence information and a long-term dependency relation of each word segment in a sentence representation sequence S in a sentence are acquired to obtain a sentence representation sequence T;

step S3: a dependency embedding layer of the network threat intelligence relational triple combined extraction model based deep learning is constructed, a syntactic dependency relation between the word segments of an input sequence T and a label of the syntactic dependency relation are acquired, syntactic dependency information of the word segment is acquired and embedded into the sentence representation sequence T, and calculation is performed in combination with a dependency type attention score and a standard GCN formula to obtain a sentence representation sequence H;

step S4: an entity decoding layer of the network threat intelligence relational triple combined extraction model based deep learning is constructed, an entity span is extracted: all possible spans are listed, the sentence representation sequence H is divided into three portions by taking the span as a center and performing max pooling on the three portions respectively to integrate span features, interactive information of span time sequence information, the span, and an entity label are acquired, and a redundancy span is filtered to obtain an entity span set L;

step S5: a relation decoding layer of the network threat intelligence relational triple combined extraction model based deep learning is constructed to extract a relational triple: all possible entity pairs are listed according to the entity span set L, a sentence representation sequence L is divided into five portions by taking an entity span pair as a center and performing max pooling on the three portions respectively except the entity span pair to integrate span features, interactive information of time sequence information of the entity span pair, the entity span pair, and a relation label is acquired, and an entity span pair sequence is inputted into a co-predictor to obtain a relational triple set Ts;

step S6: iterative training is performed on network threat intelligence to obtain a network threat intelligence relational triple combined extraction model; and step S7: massive network threat intelligence is inputted into the network threat intelligence relational triple combined extraction model to obtain a relational triple.

Further, in step S1, the entity type words and the relation type words are encoded first by using the BERT model to acquire an entity type word embedding and a relation type work embedding, respectively Pe and Pr; and then the network threat intelligence sentence sequence is inputted into the BERT model to be encoded to obtain the sentence representation sequence S.

The encoding layer is intended to convert the inputted network threat intelligence text information into the computer identifiable vector representation and acquire semantic information of the sentence or the word itself. Specific steps are as follows:

step S1.1: each word in a sentence Seq to be processed is decomposed into a word segmentation set representation $E=\{e_1, e_2, \ldots, e_n\}$ with fine granularity, and the original sentence is encoded by the BERT model to generate a novel sentence representation sequence $S=\{s_1, s_2, \ldots, s_n\} \in \mathbb{R}^{n \times d_s}$, where $e_1$ represents the number of each word segmentation, n represents a word segmentation length of the sentence, and $d_s$ represents the dimension of $s_i$, with a formula as follows:

$$S=\text{BERT}(E)=\{s_1, s_2, \ldots, s_n\}$$

step S1.2: the entity type word embedding and the relation type word embedding are acquired, the entity type words and the relation type words are encoded by using the BERT model to respectively obtain an entity type word embedding $Pe=\{pe_1, pe_2, \ldots, pe_z\} \in \mathbb{R}^{z \times d_e}$ and a relation type word embedding $Pr=\{pr_1, pr_2, \ldots, pr_r\} \in \mathbb{R}^{r \times d_r}$, where $d_e$ is an embedding dimension of an entity type label work, z represents a quantity of the entity type label words, $d_r$ is embedding dimensions of the relation type label words, and r is a quantity of the relation type label words.

Further, in step S2, the sentence representation sequence S outputted by the encoding layer is inputted into the Bi-LSTM network for feature extraction to acquire the time sequence information and the long-term dependency relation of each word segment in the sentence, so as to obtain the sentence representation sequence T.

The time sequence embedding layer is intended to acquire the time sequence information with finer granularity between word segmentations of the sentence, so that context semantic representation is enhanced; the sentence representation sequence S outputted by the encoding layer is inputted into the BiLSTM network to acquire the time sequence information and the long-term dependency relation of each word segment in the sentence. A formula to obtain the novel sentence representation sequence $T=\{t_1, t_2, \ldots, t_n\}$ is as follows:

$$\begin{cases} \vec{t_i^v} = \overrightarrow{LSTM}(\vec{t_{i-1}^v}, t_i^{v-1}) \\ \overleftarrow{t_i^v} = \overleftarrow{LSTM}(t_i^{v-1}, \overleftarrow{t_{i-1}^v}) \end{cases}$$

$$t_i^{v-1} = [\vec{t_i^v}; \overleftarrow{t_i^v}], T = \{t_1^v, t_2^v, \ldots, t_n^v\}$$

where $T \in \mathbb{R}^{n \times 2d_l}$, $d_l$ is the dimension of a hidden layer of Bi LSTM, "[;]" represents a vector connecting operation, $\longrightarrow$ represents forward LSTM, $\longleftarrow$ represents reverse LSTM, and v represents the number of hidden layers of BiLSTM.

Further, in step S3, a Stanford Core-NLP toolkit is used first to acquire the syntactic dependency relation between the word segments inputted into the sentence representation sequence T and the label of the dependency relation, then the dependency information is embedded into the sentence representation through A-GCN, the context semantic representation is further enhanced, and the novel sentence representation sequence H is outputted.

The dependency embedding layer is intended to acquire the syntax dependency information with fine granularity between the word segmentations of the sentence, so as to enhance the context semantic representation. Specific steps are as follows:

step S3.1: a syntax dependency tree of the inputted sentence is acquired first by using a Stanford Core NLP tool, then a type adjacent matrix $Tp(tp_{i,j})_{n \times n}$ is established according to the sentence representation sequence and the syntax dependency tree, where $tp_{i,j}$ represents the dependency relation type between $t_i$ and $t_j$; moreover, to make the A-GCN capable of processing a digraph, each dependency type is connected to "in" and "out" to respectively represent a forward relation and a reverse relation.

step S3.2: T and $Tp(tp_{i,j})_{n \times n}$ are inputted into the A-GCN to acquire syntax dependency information of the word segmentation, where $tp_{i,j}$ represents the dependency relation type between $t_i$ and $t_j$; and a specific implementing process of the A-GCN is as follows: first, a connecting weight between $t_i$ and $t_j$ is calculated first:

$$p_{i,j}^k = \frac{a_{i,j} \cdot \exp(y_i^k \cdot y_j^k)}{\sum_{j=1}^n a_{i,j} \cdot \exp(y_i^k \cdot y_j^k)}$$

where k represents the number of layers of GCN, $a_{i,j}$ represents a connecting weight value of a position (i,j) in a standard adjacent matrix A, and "." represents an inner product. $y_i^k \in \mathbb{R}^{1 \times (d_g^{k-1} + d_w)}$ and $y_j^k \in \mathbb{R}^{1 \times (d_g^{k-1} + d_w)}$ respectively are intermediate representation vectors of $t_i$ and $t_j$, $d_w$ is an embedding dimension of the dependency relation type, $d_g^{k-1}$ is the dimension of the $k-1^{th}$ hidden layer of the A-GCN, and in a case that k is 1, $d_g$ is equal to $2d_l$. Specifically, $$y_i^k = = [h_i^{k-1}; q_{i,j}^{tp}]$$

$$y_j^k = = [h_j^{k-1}; q_{i,j}^{tp}]$$

where $h_i^{k-1}$ represents an output sequence of previous GCN, and in a case that k is 1, $h_i^{k-1}$ represents an output sequence of the time sequence embedding layer. $q_{i,j}^{tp} \in \mathbb{R}^{1 \times d_w}$ represents embedding of the dependency relation type between $t_i$ and $t_j$, a trainable parameter.

Step S3.3: the novel sentence representation sequence $H = \{h_1, h_2, \ldots, h_n\}$ is calculated in combination with the dependency type attention score and the standard GCN formula, specifically as follows:

$$h_i^k = GCN(p_{i,j}^k; \tilde{h}_j^{k-1})$$

where $\tilde{h}_j^{k-1}$ is an enhanced representation of the fused dependency relation type of $h_j^{k-1}$.

$$\tilde{h}_j^{k-1} = h_j^{k-1} + q_{i,j}^{tp} W_{Tp}^k$$

where $W_{Tp}^k \in \mathbb{R}^{d_g^{k-1} \times d_q}$ is the trainable parameter, and this parameter keeps the dependency relation type embedding $q_{i,j}^{tp}$ and the input sequence $h_j^{k-1}$ at the same dimension by way of linear conversion.

Further, in step S4, all possible spans are listed first, the sentence representation sequence is divided into three portions by taking the span as a center and max pooling is performed on the three portions respectively to integrate span features; then the three representation sequences are connected and inputted into the BiLSTM network to acquire the span time sequence information, so as to enhance the span representation; then the span representation and the entity label word embedding Pe are together inputted into a scaled dot-product attention module to acquire interactive information of the entity label span and the entity label; and finally, the span sequence is inputted into the entity extractor to obtain an entity span set L.

The entity decoding layer is intended to extract all entity spans that accord with requirements. Specific steps are as follows:

Step S4.1: the span is defined as a sequence formed by consecutive word segments with any length in the sentence. Therefore, to acquire the span feature, it is necessary to list all probable spans by a listing method. So, for a sentence with the length of the word segmentation n, n(1+n)/2 span units can be listed. In view of a normal circumstance, the entity span will not be particularly long. To reduce the model complexity, a maximum length limitation m of the span is set. According to the output representation sequence H of the dependency embedding layer, the final span is represented as:

$$U = \{u_i^j = \{h_i, h_{i+1}, \ldots, h_{i+j-1}\}; 1 \leq i \leq n, 1 \leq j \leq m\}$$

where i represents an initial position of the span in the sentence, and j represents the length of the span.

Step S4.2: the sentence representation sequence is divided into $\{ce_{up}, u_i^j, ce_{down}\}$ by taking the span as a center, where $ce_{up} = \{h_1, h_2, \ldots, h_{i-1}\}$, $ce_{down} = \{h_{i+j}, h_{i+j+1}, \ldots, h_n\}$. After division, $ce_{up}$, $u_i^j$, and $ce_{down}$ are subjected to max pooling to integrate the span features, so as to obtain novel span representations $se_{up}$, $w_i^j$, and $se_{down}$, with a formula as follows:

$$se_{up} = \text{max-pooling}(ce_{up})$$

$$w_i^j = \text{max-pooling}(u_i^j)$$

$$se_{down} = \text{max-pooling}(ce_{down})$$

Step S4.3: $\{ce_{up}, u_i^j, ce_{down}\}$ obtained previously is inputted into the BiLSTM to acquire the span time sequence information to further enhance the span representation, with a formula as follows:

$$BiLSTM(\{ce_{up}, w_i^j, se_{down}\}) = \{\tilde{ce}_{up}, \tilde{w}_i^j, \tilde{se}_{down}\}$$

step S4.4: the span dimension information is fused into the span representation by using a multilayer perceptron MLP to further enhance the span representation, where the span dimension embedding s_e is acquired by random initialized embedding. A specific fusion process is as follows:

$$l_i^j = MLP([\tilde{w}_i^j]; s\_e])$$

Step S4.5: the span representation $a_e$ based on the entity label is acquired by using the scaled dot-product attention mechanism, and the label information of the entity is fully extracted. A specific implementing process is as follows:

$$a_e = \text{softmax}\left(\frac{(l_j^j W_q)(Pe W_k)^T}{\sqrt{d_s}}\right) Pe$$

where $W_q \in \mathbb{R}^{d_s \times d_s}$ and $W_k \in \mathbb{R}^{d_e \times d_s}$ are learnable parameters.

Step S4.6: $l_i^j$ and $a_e$ are connected and inputted into the entity extractor, and the redundancy span is filtered to obtain the span set $L = \{l_1, l_2, \ldots, l_f\}$ accord with requirements, where to facilitate representation, $l_f$ is equivalent to $l_i^j$. A formula is as follows:

$$P_{en} = \text{softmax}([l_i^j; a_e] W_{en} + b_{en})$$

where $W_{en} \in \mathbb{R}^{(d_s + d_e) \times (z+1)}$ and $b_{en} \in \mathbb{R}^{1 \times (z+1)}$ are learnable parameters, $P_{en}$ represents a distribution probability that the span unit belongs to each type of entities, and the span unit with the highest probability being non-entity is filtered out.

Further, in step S5, all probable entity pairs are listed according to the entity set L, the sentence representation sequence is divided into five portions by taking the entity span as the center, and the three portions except for the entity span pairs are respectively subjected to max pooling. Then the five representation sequences are connected and inputted into the BiLSTM network to acquire the time sequence of the entity span pairs, so as to enhance the span representation. Then the span representation and the relation label word embedding Pr are together inputted into the attention module to acquire the interactive information of the entity span pairs and the relation label, so as to enhance the importance of the key features. Finally, the entity span pair sequence is inputted into the co-predictor to obtain the relational triple set Ts.

The relation decoding layer is intended to extract all relational triples in the sentence. Specific steps are as follows:

step S5.1: all probable entity span pairs are listed according to the output entity span set L of the entity decoding layer, and the word representation is divided into $\{cr_{up}, l_{i_1}^{j_1}, cr_{cen}, l_{i_2}^{j_2}, cr_{down}\}$ by taking the entity span as the center. $i_1$ and $j_1$ respectively represent the initial position and the length of the first entity span in the entity span pairs, and $i_2$ and $j_2$ respectively represent the initial position and the length of the second entity span in the entity span pairs, $cr_{up}=\{h_1, h_2, \ldots, h_{i_1-1}\}$, $cr_{cen}=\{h_{i_1+j_1}, h_{i_1+j_1+1}, \ldots, h_{i_2-1}\}$, $cr_{down}=\{h_{i_2+j_2}, h_{i_2+j_2+1}, \ldots, h_n\}$. After division, $cr_{up}$, $cr_{cen}$, and $cr_{down}$ are subjected to max pooling to integrate the span features, so as to obtain novel span representations $sr_{up}$, $sr_{cen}$, and $sr_{down}$, with a formula as follows:

$$sr_{up}=\text{max-pooling}(cr_{up})$$

$$sr_{cen}=\text{max-pooling}(cr_{cen})$$

$$sr_{down}=\text{max-pooling}(cr_{down})$$

Step S5.2: $\{cr_{up}, l_{i_1}^{j_1}, cr_{cen}, l_{i_2}^{j_2}, cr_{down}\}$ obtained previously is inputted into the BiLSTM to acquire the time sequence information of the entity span pairs to further enhance the span representation, with a formula as follows:

$$BiLSTM(\{cr_{up}, l_{i_1}^{j_1}, cr_{cen}, l_{i_2}^{j_2}, cr_{down}\}) = \{\tilde{cr}_{up}, \tilde{l}_{i_1}^{j_1}, \tilde{cr}_{cen}, \tilde{l}_{i_2}^{j_2}, \tilde{cr}_{down}\}$$

Step S5.3: then, the entity span pair representation $a_r$ based on the entity label is acquired by using the additive attention mechanism, and the label information of the entity is fully extracted. A formula is as follows:

$$sc=W_v \tanh(l_h W_n + l_t W_t + Pr W_r)^T$$

$$a_r=\text{softmax}(sc)Pr$$

where $W_h \in \mathbb{R}^{d_s \times d_s}$, $W_t \in \mathbb{R}^{d_s \times d_s}$, $W_r \in \mathbb{R}^{d_r \times d_s}$, and $W_v \in \mathbb{R}^{1 \times d_s}$ are trainable parameters, and $\tilde{l}_h$ and $\tilde{l}_t$ respectively represent a head entity span and a tail entity span in both $\tilde{l}_{i_1}^{j_1}$ and $\tilde{l}_{i_2}^{j_2}$.

Step S5.4: the intensified entity span pair representation sequence $[\tilde{l}_h; \tilde{l}_t; a_r]$ is inputted into one multilayer perceptron MLP1 to calculate the entity pair relation score:

$$x_1=MLP1([\tilde{l}_h; \tilde{l}_t; a_r])$$

step S5.5: the original entity span pair inputted by the entity decoding layer is represented as $l_h$ and $l_t$, and $l_h$ and $l_t$ are equivalent to the head entity span and the tail entity span in both $l_{i_1}^{j_1}$ and $l_{i_2}^{j_2}$. Two multilayer perceptrons MLP2 and MLP3 are used to perform non-linear conversion on $l_h$ and $l_t$, and then a biaffine predictor is used to calculate the entity pair relation score:

$$bf_h=MLP2(l_h)$$

$$bf_t=MLP3(l_t)$$

$$x_2=bf_h^T W_u bf_t + [bf_h; bf_t] W_{bf} + b_{bf}$$

$W_u \in \mathbb{R}^{r \times d_{bf} \times d_{bf}}$, $W_{bf} \in \mathbb{R}^{2d_{bf} \times r}$, and $b_{bf} \in \mathbb{R}^{1 \times r}$ are learnable parameters, and $d_{bf}$ is the dimension of the hidden layer of the biaffine predictor.

Step S5.6: $x_1$ and $x_2$ are combined and inputted into the co-prediction layer. To identify an overlapping relation, the co-prediction layer uses a sigmoid activation function to acquire a relation probability. A final entity pair relation probability is as follows:

$$P_{re}=\text{sigmoid}(x_1+x_2)$$

relational triples with $P_{re}$ greater than or equal to 0.5 are stored to Ts.

Further, in step S6, a relation annotation is performed on a DNRTI data set to obtain a RE-DNRTI data set, the RE-DNRTI data set is inputted into the network threat intelligence relational triple combined extraction model for 50-time iterative training, and parameter settings with an optimal effect are selected to obtain an optimal network threat intelligence relational triple combined extraction model.

Further, in step S7, the massive network threat intelligence is divided by taking sentences as units and is inputted into the network threat intelligence relational triple combined extraction model to obtain the relational triple.

The preferred specific embodiments of the present invention are described in detail above. It should be understood that those of ordinary skill in the art can make various modifications and variations in accordance with concept of the present invention without creative efforts. Therefore, technical solutions capable of being obtained by technicians in the technical field through logical analysis, inference or limited experiments in accordance with concept of the present invention based on the prior art shall fall into the scope of protection determined by claims.

The invention claimed is:

1. A network threat intelligence relational triple combined extraction method based on deep learning, comprising the following steps:

step S1: converting input text information into a vector representation and acquiring semantic information: encoding entity type words and relation type words to acquire label words, and encoding a network thread intelligence sentence sequence to obtain a sentence sequence S;

step S2: acquiring time sequence information and a long-term dependency relation of each word segment in a sentence representation sequence S in a sentence to obtain a sentence representation sequence T;

step S3: acquiring a syntactic dependency relation between the word segments of an input sequence T and a label of the syntactic dependency relation, acquiring syntactic dependency information of the word segment and embedding the same into the sentence representation sequence T, and performing calculation in combination with a dependency type attention score and a standard GCN formula to obtain a sentence representation sequence H;

step S4: extracting an entity span: listing all possible spans, dividing the sentence representation sequence H into three portions by taking the span as a center and performing max pooling on the three portions respectively to integrate span features, acquiring interactive information of span time sequence information, the span and an entity label, and filtering a redundancy span to obtain an entity span set L;

step S5: extracting a relational triple: listing all possible entity pairs according to the entity span set L, dividing a sentence representation sequence L into five portions by taking an entity span pair as a center and performing max pooling on the three portions respectively except the entity span pair to integrate span features, acquiring interactive information of time sequence information of the entity span pair, the entity span pair, and a relation label, and inputting an entity span pair sequence into a co-predictor to obtain a relational triple set Ts;

step S6: performing iterative training on network threat intelligence to obtain a network threat intelligence relational triple combined extraction model; and step S7: inputting massive network threat intelligence into the network threat intelligence relational triple combined extraction model to obtain a relational triple.

2. The network threat intelligence relational triple combined extraction method based on deep learning according to claim 1, wherein each word in the input text information in step S1 is decomposed into word segment sets with smaller granularity and the word segment sets are inputted into a BERT model for encoding.

3. The network threat intelligence relational triple combined extraction method based on deep learning according to claim 1, wherein in step S1, the entity type words and the relation type words are encoded by using the BERT model to obtain an entity type word embedding and a relation type work embedding, respectively $Pe=\{pe_1, pe_2, \ldots, pe_z\} \in \mathbb{R}^{z \times d_e}$ and $Pr=\{pr_1, pr_2, \ldots, pr_r\} \in \mathbb{R}^{r \times d_r}$, wherein $d_e$ is embedding dimensions of the entity type label words, z represents a quantity of the entity type label words, $d_r$ is embedding dimensions of the relation type label words, and r is a quantity of the relation type label words.

4. The network threat intelligence relational triple combined extraction method based on deep learning according to claim 1, wherein in step S2, the sentence representation sequence S outputted by an encoding layer is inputted into a BiLSTM network for feature extraction to acquire the time sequence information and the long-term dependency relation of each word segment in the sentence.

5. The network threat intelligence relational triple combined extraction method based on deep learning according to claim 1, wherein in step S3, a Stanford Core-NLP toolkit is used first to establish a type adjacent matrix $Tp(tp_{i,j})_{n \times n}$, wherein $tp_{i,j}$ represents a dependency relation type between $t_i$ and $t_j$, the syntactic dependency relation between the word segments inputted into the sentence representation sequence T and the label of the dependency relation are acquired, and then the sentence representation sequence T and the type adjacent matrix $Tp(tp_{i,j})_{n \times n}$ are inputted into an A-GCN to acquire the syntactic dependency information of the word segment.

6. The network threat intelligence relational triple combined extraction method based on deep learning according to claim 1, wherein in step S4, the three representation sequences are connected to be inputted into the BiLSTM network to acquire the span time sequence information, span dimension information is fused into a span representation by using a multilayer perceptron MLP, a span representation based on the entity label is acquired by using a scaled-dot product attention mechanism, the span representations are connected to be inputted into an entity extractor, and the redundancy span is filtered to obtain a span set L which meets a requirement.

7. The network threat intelligence relational triple combined extraction method based on deep learning according to claim 1, wherein in step S5, the five representation sequences are connected to be inputted into the BiLSTM network to acquire the time sequence information of the entity span pairs, an entity span pair representation based on the relation label is acquired by using an additive attention mechanism, an intensified entity span pair representation sequence is inputted into a multilayer perceptron MLP1 to calculate an entity pair relation score, an entity pair relation score of an original entity span pair inputted by an entity encoding layer is calculated by using a biaffine predictor, and the two entity pair relation scores are combined to be inputted into a co-prediction layer; and to identify an overlapping relation, the co-prediction layer uses a sigmoid activation function to acquire a relation probability and stores a relational triple with the relation probability greater than or equal to 0.5 to Ts.

8. The network threat intelligence relational triple combined extraction method based on deep learning according to claim 1, wherein in step S6, a relation annotation is performed on a DNRTI data set to obtain a RE-DNRTI data set, the RE-DNRTI data set is inputted into the network threat intelligence relational triple combined extraction model for 50-time iterative training, and parameter settings with an optimal effect are selected to obtain an optimal network threat intelligence relational triple combined extraction model.

9. The network threat intelligence relational triple combined extraction method based on deep learning according to claim 1, wherein in step S7, the massive network threat intelligence is divided by taking sentences as units and is inputted into the network threat intelligence relational triple combined extraction model to obtain the relational triple.

10. The network threat intelligence relational triple combined extraction method based on deep learning according to claim 1, wherein the constructing a network threat intelligence relational triple combined extraction model based on deep learning comprises constructing the encoding layer, a time sequence embedding layer, a dependency embedding layer, an entity decoding layer, and a relation decoding layer, wherein the encoding layer is provided with the BERT model for sentence encoding and label encoding, the time sequence embedding layer is provided with a fused time sequence code of the BiLSTM network, the dependency embedding layer is provided with the A-GCN network to embed the dependency information into the sentence to represent, the entity decoding layer is provided with the BiLSTM network, the attention mechanism, and the entity extractor, and the relation decoding layer is provided with the BiLSTM network, the attention mechanism, and the co-predictor; and the encoding layer is connected to the time sequence embedding layer, the time sequence embedding layer is connected to the dependency embedding layer, the dependency embedding layer is connected to the entity decoding layer, the entity decoding layer is connected to the relation decoding layer, and the encoding layer is further connected to the entity decoding layer and the relation decoding layer.

* * * * *